(12) United States Patent
Bouchard et al.

(10) Patent No.: US 9,953,246 B2
(45) Date of Patent: Apr. 24, 2018

(54) FEATURE-PRESERVING NOISE REMOVAL

(71) Applicant: THE REGENTS OF THE UNIVERSITY OF CALIFORNIA, Oakland, CA (US)

(72) Inventors: Louis Bouchard, Los Angeles, CA (US); Khalid Youssef, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 59 days.

(21) Appl. No.: 14/971,775

(22) Filed: Dec. 16, 2015

(65) Prior Publication Data
US 2016/0171727 A1 Jun. 16, 2016

Related U.S. Application Data

(60) Provisional application No. 62/092,762, filed on Dec. 16, 2014.

(51) Int. Cl.
G06K 9/36 (2006.01)
G06K 9/66 (2006.01)
(Continued)

(52) U.S. Cl.
CPC .......... G06K 9/66 (2013.01); G06K 9/6273 (2013.01); G06T 5/002 (2013.01); G06T 2207/10024 (2013.01); G06T 2207/10032 (2013.01); G06T 2207/10061 (2013.01); G06T 2207/10081 (2013.01); G06T 2207/10088 (2013.01); G06T 2207/10116 (2013.01); G06T 2207/10132 (2013.01); G06T 2207/20072 (2013.01);
(Continued)

(58) Field of Classification Search
CPC ........ G06K 9/66; G06K 9/481; G06K 9/6273; G06T 2207/10088; G06T 2207/10116; G06T 2207/10132; G06T 2207/20081; G06T 5/002; G06T 11/008; G06T 2207/10024; G06T 2207/10032; G06T 2207/10061; G06T 2207/10081; G06T 2207/20072; G06T 2207/20076
USPC ........................................................ 382/275
See application file for complete search history.

(56) References Cited

U.S. PATENT DOCUMENTS 7,545,965 B2 * 6/2009 Suzuki .................... G06T 5/007
382/128
8,229,247 B1 * 7/2012 Huang .................. G06T 3/0093
345/619

OTHER PUBLICATIONS

Buades A et al. (2005), "A review of image denoising algorithms, with a new one", Multiscale Model. Simul., vol. 4, No. 2, pp. 490-530.
(Continued)

Primary Examiner — Tom Y Lu
(74) Attorney, Agent, or Firm — Foley & Lardner LLP; Cliff Z. Liu

(57) ABSTRACT

A noise removal method includes receiving in a de-noising system multiple noisy copies of a target image; providing the noisy copies as input data to the de-noising system in a training phase, and determine a noise distribution for the plurality of noisy copies. The method further includes, for n stages of the de-noising system, transforming the input data into an output; reconstructing the output; and providing the reconstructed output as input data. The method may further include receiving a new image and generating a de-noised image based on the determined noise distribution.

18 Claims, 8 Drawing Sheets

(51) Int. Cl.
    *G06T 5/00*      (2006.01)
    *G06K 9/62*      (2006.01)
(52) U.S. Cl.
    CPC ............... *G06T 2207/20076* (2013.01); *G06T 2207/20081* (2013.01); *G06T 2207/20084* (2013.01)

(56) References Cited

OTHER PUBLICATIONS

Burger H et al. (2012), "Image denoising: Can plain neural networks compete with BM3D?" Proc. CVPR IEEE, pp. 2392-2399.
Dabov K et al. (2007), "Image denoising by sparse 3D transform-domain collaborative filtering," IEEE Trans. Image Process., vol. 16, No. 8, pp. 2080-2095.
Elad M et al. (2006), "Image denoising via sparse and redundant representations over learned dictionaries," IEEE Trans. Image Process., vol. 15, No. 12, pp. 3736-3745.
Getreuer P (2012), "Rudin-Osher-Fatemi total variation denoising using split bregman," Image Processing On Line, vol. 4.2, pp. 74-95.
Hagan M et al. (1994), "Training feedforward networks with the Marquardt algorithm," IEEE Trans. Neural Networks, vol. 5, pp. 989-993.
Hornik K et al. (1989), "Multilayer feedforward networks are universal approximators," Neural Networks, vol. 2, pp. 359-366.
Maggioni M et al. (2012), "Nonlocal transform-domain denoising of volumetric data with groupwise adaptive variance estimation," Proc. SPIE 8296, Computational Imaging.
Mairal J et al. (2009), "Online dictionary learning for sparse coding", Proceedings of the 26th Annual International Conference on Machine Learning, vol. 8, pp. 689-696.
Protter M et al. (2009), "Image sequence denoising via sparse and redundant representations," IEEE Trans. Image Process., vol. 18, No. 1, pp. 27-35.
Rumelhart D et al. (1986), "Learning representations by back-propagating errors," Nature, vol. 323, pp. 533-536.
Shyam Anand C et al. (2010), "Wavelet domain non-linear filtering for MRI denoising," Magn. Reson. Imag., vol. 28, pp. 842-861.
Wang Z et al. (2004), "Image quality assessment: From error visibility to structural similarity", IEEE Trans. Image Process., vol. 13, No. 4, pp. 600-612.
Wen Liu R et al. (2014), "Generalized total variation-based MRI rician denoising model with spatially adaptive regularization parameters," Magn. Reson. Imag., vol. 32, pp. 702-720.
Yan R et al. (2013), "Nonlocal hierarchical dictionary learning using wavelets for image denoising," IEEE Trans. Image Process., vol. 22, No. 12, pp. 4689-4698.
Youssef K (2015), "Feature-Preserving Noise Removal", IEEE Trans Med Imaging. Sep. 2015, 34(9):1822-9.
Zhang L et al. (2011), "FSIM: a feature similarity index for image quality assessment," IEEE Trans. Image Process., vol. 20, No. 8, pp. 2378-2386.

\* cited by examiner

A

B

C

D

E

F

G

FEATURE-PRESERVING NOISE REMOVAL

CROSS-REFERENCE TO RELATED PATENT APPLICATIONS

This application claims the benefit of U.S. Provisional Patent Application 62/092,762 filed Dec. 16, 2014 to Bouchard et al., titled "Feature-Preserving Image Noise Removal," the contents of which are incorporated herein by reference in their entirety.

STATEMENT OF FEDERALLY SPONSORED RESEARCH OR DEVELOPMENT

This invention was made with Government support under FA9550-11-1-0270, awarded by the Air Force Office of Scientific Research and under HL114086, awarded by the National Institutes of Health. The Government has certain rights in the invention.

TECHNICAL FIELD

The present disclosure relates generally to data processing techniques, and, more particularly, to noise removal from a set of one-dimensional or multi-dimensional data.

BACKGROUND

Removing noise from a set of data may require a priori knowledge of the noise distribution. Various techniques of noise removal yield good performance if the set of data obeys certain conditions consistent with technique assumptions, such as noise statistics or, in the case of image processing, the type of patterns contained in the image. However, if the assumptions are not met, these techniques can give rise to artifacts or losses in data.

SUMMARY

A noise removal system configured to perform a first stage of reconstruction including a first portion. The first portion of the first stage of reconstruction includes to receive a plurality of copies of a data space, and for each copy of the plurality of copies, create an input vector representing the copy; the input vector created by applying a window to successive locations of the copy, and for each of the successive locations, transforming data within the window into a single data point of the input vector. The first portion of the first stage of reconstruction further includes to provide a set of input vectors, including an input vector for each copy of the plurality of copies, to a first stage neural network, receive from the first stage neural network an output vector representing the set of input vectors, and generate from the output vector a reconstructed image.

A noise removal method includes performing at least one stage of reconstruction, each stage including a plurality of portions performed substantially concurrently. The method in each stage of reconstruction includes receiving a set of copies of a data space; transforming each copy of the data space into an input vector; providing each of the plurality of input vectors for operation by each of the plurality of portions; receiving an output vector from each of the plurality of portions; and reconstructing each output vector into a representation of the data space. The method further includes providing a set of data space representations comprising the representations of the data space reconstructed from the output vectors of each of the plurality of portions.

A noise removal method includes receiving in a de-noising system multiple noisy copies of a target image; providing the noisy copies as input data to the de-noising system in a training phase, and determine a noise distribution for the plurality of noisy copies. The method further includes, for n stages of the de-noising system, transforming the input data into an output; reconstructing the output; and providing the reconstructed output as input data. The method may further include receiving a new image and generating a de-noised image based on the determined noise distribution.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
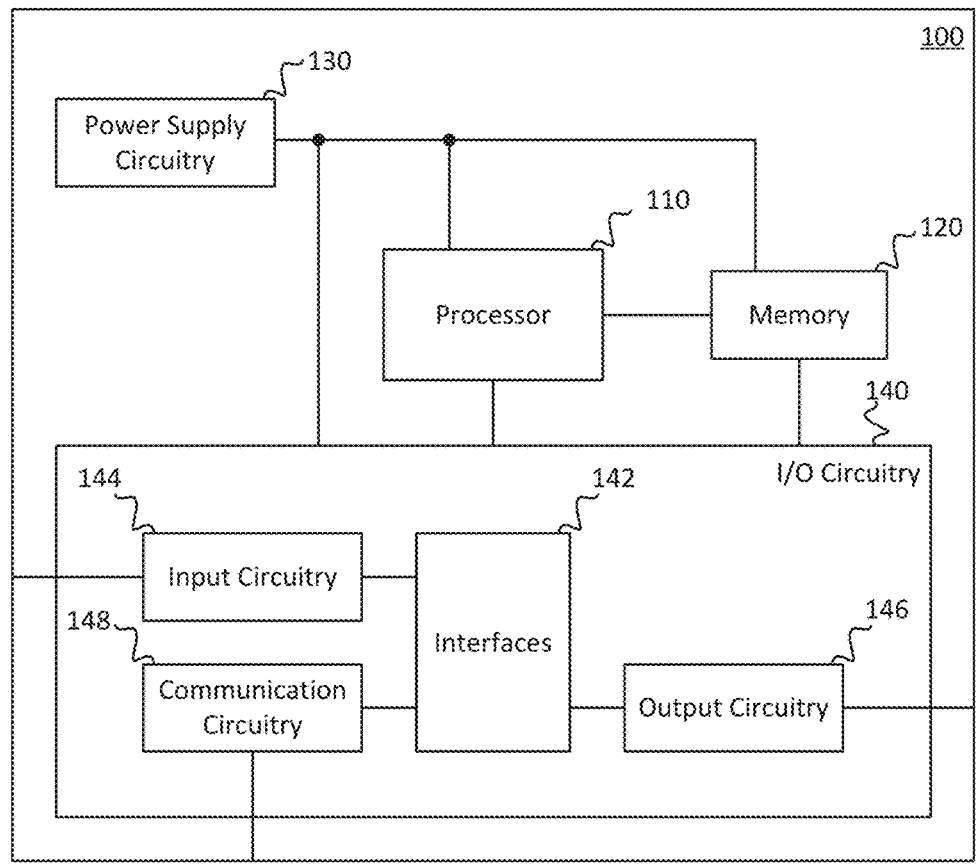
FIG. 1 is a block diagram representing a de-noising system according to an embodiment of the present disclosure.

Many conventional data restoration techniques use transform-domain filters, which separate noise from a sparse signal among the transform components, or apply spatial smoothing filters in real space where the filter design relies on prior assumptions about the noise statistics. These filters may also reduce the information content of data by suppressing spatial frequencies or by recognizing a limited set of features.

Using the techniques of the present disclosure, improved de-noising may be achieved, resulting in clearer and sharper features than is possible with other noise removal techniques.

For example, de-noising can be efficiently performed using a nonlinear filter according to one or more embodiments, which filter operates along patch neighborhoods and multiple copies of an original data source. The use of patches allows the technique to account for spatial correlations in the random field, whereas the multiple copies are used to recognize noise statistics. The nonlinear filter, which may be implemented in one or more embodiments by a hierarchical multistage system of multilayer perceptrons, outperforms state-of-the-art de-noising techniques such as those based on collaborative filtering and total variation.

A technique according to an embodiment of the present disclosure uses multiple copies of a data source applied to multiple layers of perceptrons. The technique is referred to herein as multi-copy multi-layer perceptrons, or MCMLP. MCMLP provides a platform to harness the advantages of machine learning with a fraction of the computational time of other machine learning techniques. The MCMLP technique can operate under extreme noise levels and is applicable to situations with arbitrary noise distributions. From the point of view of conventional metrics (e.g., peak signal-to-noise ratio (PSNR), feature similarity (FSIM), or mean structural similarity (MSSIM)), the technique outperforms state-of-the art methodologies and can handle both additive and multiplicative noises, including Gaussian and signal-dependent Rician noises.

In one or more embodiments, the MCMLP technique includes noise estimation, to extend the applicability of MCMLP to applications with arbitrary noise distributions where a clean sample data source (e.g., a clean image) cannot be provided. In one or more embodiments, the MCMLP technique provides the capability for hybridizing the MCMLP technique with one or more other noise removal methodologies, because various noise removal methodologies may excel in some aspects and fail in others, and MCMLP allows combining advantages of several methodologies by adding outcomes from other noise removal methodologies to inputs of the MCMLP. These developments allow for the extension of the MCMLP technique to challenging applications such as sodium magnetic resonance imaging (MRI) and atomic resolution electron tomography.

With respect to imaging, compared to other noise removal methodologies, the de-noising techniques of the present disclosure can restore images without blurring them, making the technique attractive, for example, for use in medical imaging where the preservation of anatomical details is desired. Another example of an application of the technique is for facial or feature recognition (e.g., in military operations, counter-terrorism operations, security, and criminal investigations). Other types of feature recognition provided by the techniques of the present disclosure may be applied, for example, to single-dimensional or multi-dimensional data, including audio, radiofrequency (RF), microwave, ultrasound, computed tomography (CT), MRI, X-ray, electron microscopy, sonar and radar data. The techniques of the present disclosure can be used to remove noise from higher dimensionality data sets, more generally, n-D data sets (where n is the dimensionality of the data). Other important features of the technique are the ability to handle arbitrary types of noises and noise distributions, to handle large quantities of data, and to handle low signal-to-noise ratio data (e.g., representing a weak signal in a noisy environment). Thus, the techniques of the present disclosure, in addition to being generally applicable for de-noising data, are further well suited for data with high levels of noise, data representing long acquisition times for time signals, and atomic scale imaging. By way of example, the de-noising techniques of the present disclosure provide for higher spatial resolution of the atomic scale imaging by removing the noise, even though the signal may be weak.

The MCMLP technique further allows flexibility in optimizing between performance and computational time.

FIG. 1 is a block diagram representing a de-noising system 100 according to an embodiment of the present disclosure. De-noising system 100 is implemented as control electronics including a processor 110, a memory 120, power supply circuitry 130, and input/output (I/O) circuitry 140. De-noising system 100 may be implemented as a stand-alone device, such as a computing device (e.g., desktop computer, laptop computer, notebook computer, smart phone or other computing device), or may be implemented within another device, such as in an imaging system or a radar system.

Processor 110 represents a programmable processor, which may be, for example, a general-purpose processor, digital signal processor, microprocessor, microcontroller, application specific integrated circuit (ASIC), field programmable gate array (FPGA), other circuitry effecting processor functionality, or multiple ones or combinations of the foregoing, along with associated logic and interface circuitry. Processor 110 may be incorporated in a system on a chip.

Memory 120 represents one or both of volatile and non-volatile memory for storing information (e.g., instructions and data). Examples of memory include semiconductor memory devices such as EPROM, EEPROM, flash memory, RAM, or ROM devices.

Portions of de-noising system 100 may be implemented as computer-readable instructions in memory 120, executed by processor 110.

An embodiment of the present disclosure relates to a non-transitory computer-readable storage medium (e.g., memory 120) having computer code thereon for performing various computer-implemented operations. The term "computer-readable storage medium" is used herein to include any medium that is capable of storing or encoding a sequence of instructions or computer codes for performing the operations and techniques described herein. The media and computer code may be those specially designed and constructed for the purposes of the embodiments of the disclosure, or they may be of the kind well known and available to those having skill in the computer software arts.

Examples of computer code include machine code, such as produced by a compiler, and files containing higher-level code that are executed by a computer using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computer) to a requesting computer (e.g., a client computer or a different server computer) via a transmission channel. Another embodiment of the disclosure may be implemented in hardwired circuitry in place of, or in combination with, machine-executable software instructions.

Power supply circuitry 130 distributes electrical power to components of de-noising system 100. Power supply circuitry 130 may include, for example, a power supply semiconductor device (e.g., a voltage regulator) with related configuration components and external filters. Power supply circuitry 130 may distribute power over multiple paths, where the power distributed in each path may have similar or different power ratings (e.g., voltage level or current level).

I/O circuitry 140 represents electrical components and optional code that together provide de-noising system 100 access to an environment external to de-noising system 100, as well as providing access between components internal to de-noising system 100. I/O circuitry 140 includes one or more interfaces 142, input circuitry 144, output circuitry 146, and communication circuitry 148.

Interfaces 142 represent electrical components and optional code, such as programmable integrated circuits, non-programmable integrated circuits, filtering components, level shifters, analog-to-digital or digital-to-analog converters, and other components, with associated electrical connections (e.g., wiring or traces, or connectors). Interfaces 142 provide electrical pathways and/or communication pathways between components of de-noising system 100. For example, one or more interfaces 142 may be provided between input circuitry 144 and communication circuitry 148, between communication circuitry 148 and output circuitry 146, or between input circuitry 144 and output circuitry 146. For another example, one or more interfaces 142 may be provided between processor 110 and input circuitry 144, output circuitry 146, or communication circuitry 148. For a further example, one or more interfaces 142 may be provided between memory 120 and input circuitry 144, output circuitry 146, or communication circuitry 148, for direct transfer of data to or from memory 120.

Input circuitry 144 provides an interface between components external to de-noising system 100 and components internal to de-noising system 100, such as a pointing device (e.g., mouse or joystick), a signal capture device (e.g., for receiving signals or data representing images, video, audio or radar), or a triggering device to trigger an exchange of information.

Data from input circuitry 144 may be stored in memory 120 for later analysis. Additionally or alternatively, raw or filtered data may be analyzed by processor 110 and the analyzed data stored in memory 120 or provided externally.

Communication circuitry 148 represents electrical components and optional code that together provide an interface from internal components of de-noising system 100 to an external network. For example, communication circuitry 148 may be a Bluetooth protocol physical layer circuit with associated software protocol layers, a Wi-Fi protocol physical layer circuit with associated software protocol layers, an Internet protocol physical layer circuit with associated software protocol layers, or other standard or proprietary circuit and software. Communication circuitry 148 may communicate bi-directionally, such that, for example, data may be sent from de-noising system 100, and instructions and updates may be received by de-noising system 100. Communication externally may be, for example, with a computing device.

Output circuitry 140 provides an interface between components internal to de-noising system 100 and components external to de-noising system 100, such as an external display or database.

Portions of de-noising system 100 may be integrated together. For example, portions of memory 120 may be integrated with processor 110, portions of I/O circuitry 140 may be integrated with processor 110, communication circuitry 148 may be integrated with an interface 142 and processor 110, or other integrations. Thus, the blocks of FIG. 1 represent groupings of circuitry by function, and illustration of circuitry as being in different blocks does not necessarily represent (although it can) a corresponding physical separation between physical components.

Figure 2A:
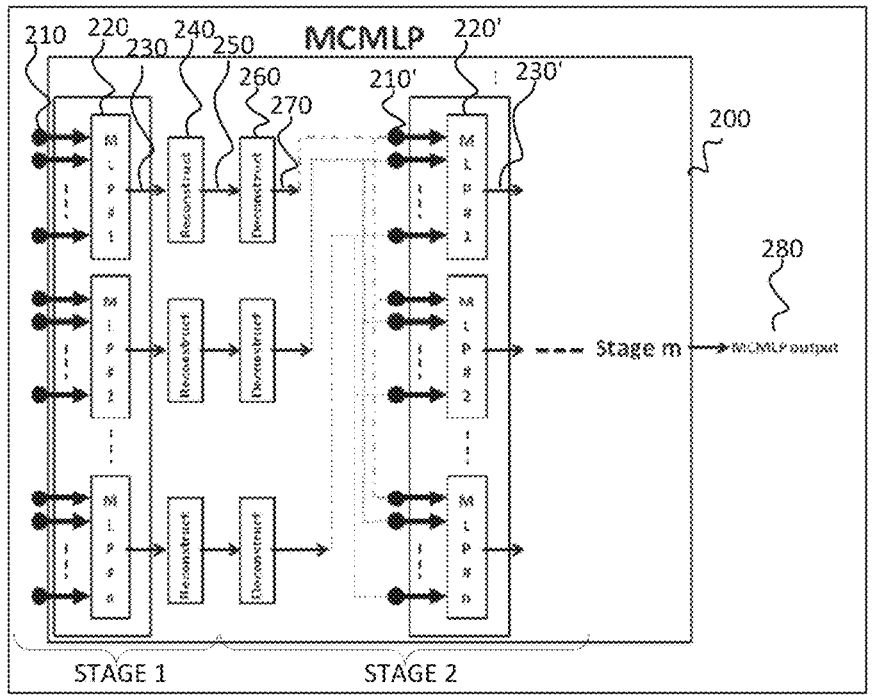
FIG. 2A illustrates conceptually a multi-copy multi-layer perceptron technique according to an embodiment of the present disclosure.

FIG. 2A illustrates conceptually the MCMLP technique according to an embodiment of the present disclosure. The technique is performed in multiple stages n of an n-stage MCMLP 200, where each stage includes multiple instances of a multiple layer perceptron (MLP) 220. In a first stage (Stage 1), multiple input vectors 210 are provided to each MLP 220 from a Stage 1 pre-processing substage (not shown) and are processed by MLP 220, and an output 230 from MLP 220 is reconstructed (block 240) to a reconstructed output 250.

Where n is greater than one in the n-stage MCMLP 200 (i.e., includes two or more stages), each reconstructed output 250 from Stage 1 is deconstructed (block 260) to a deconstructed output 270 in a pre-processing substage of the second stage (Stage 2). Deconstructed output 270 is in the form of a vector, which is provided as an input vector 210' to multiple MLPs 220' of Stage 2. Similarly, output 230' from each MLP 220' is reconstructed and deconstructed and provided as an input vector (not shown) to multiple MLPs (not shown) of a third stage (not shown) of n-stage MCMLP 200, and so forth to the nth stage of n-stage MCMLP 200. An MCMLP 200 output 280 is a selected output from among the MLPs of the nth stage. As can be appreciated, MCMLP 200 may be implemented in one of, or a combination of, software, firmware and hardware. For example, MCMLP 200 may be implemented in hardware with reprogrammable firmware and reconfigurable hardware or software registers.

De-noising system 100 may include a user interface that allows a user to select a set of data (e.g., an image), select data processing techniques, and interact with, or control, the de-noising system 100.

Figure 2B:
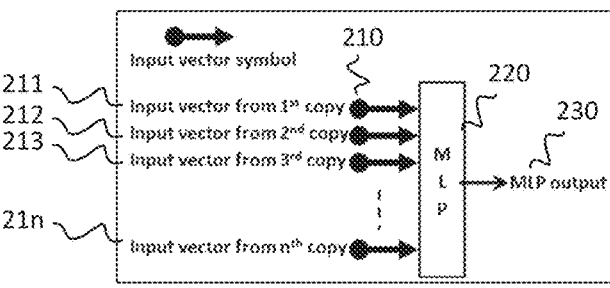
FIG. 2B illustrates conceptually a portion of a multi-copy multi-layer perceptron technique according to an embodiment of the present disclosure.

FIG. 2B illustrates conceptually a single instance of MLP 220 (e.g., MLP 220, 220', 220" and so forth), showing multiple input vectors 210 (e.g., input vectors 211, 212, 213 ... 21n, denoted in group form as 211 ... 21n) received at MLP 220, and a single output vector 230. Each input vector 210 represents one copy of a set of data. There are a number 'n' of input vectors 210 and a number 'm' of stages in this embodiment. The number of input vectors 210 in the first stage is equal to the number of noisy copies. The number of input vectors 210 (e.g., input vectors 210') in each consecutive stage is equal to the number of MLPs 220 in the preceding stage. In one or more embodiments, the number of MLPs 220 in each stage is equal to the number of noisy copies. In general, however, each stage can have a different number of MLPs 220.

Figure 3:
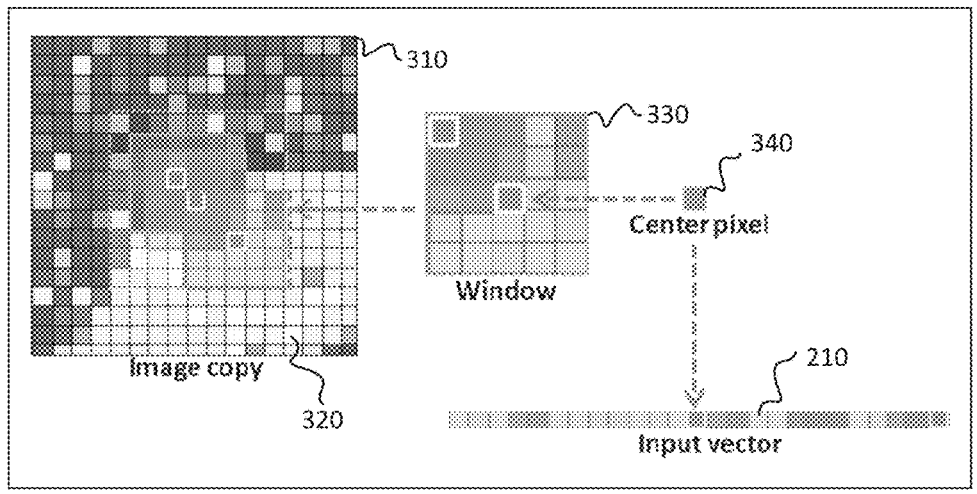
FIG. 3 illustrates a set of image data.

FIG. 3 illustrates a copy 310 of a set of image data by way of example. However, the technique is not limited to image data. Copy 310 of the set of image data, labeled "image copy" in FIG. 3, includes multiple pixels 320. A window 330 of a selected area (shown in FIG. 3 as a 5×5 pixel area) is moved around the copy 310. A data point of interest (e.g., a pixel of interest, or a center pixel as shown in FIG. 3) within window 330 is used to identify a window index. The window index is then used as an offset into a corresponding input vector 210. For example, a 5×5 window 330 representing the twenty-five pixels in the upper left corner of image copy 310 of FIG. 3 may have a window index of zero and may be represented as a first entry in input vector 210 (offset of zero), a window 330 shifted one pixel to the right may have a window index of one and may be represented as a second entry in input vector 210 (offset of one), and so forth. Of course, many other schemes for moving window 330 around copy 310 are envisioned. It is important to note that one or more of the entries in input vector 210 may represent a different-sized window 330 than represented by other entries in input vector 210, such that a number of window 330 sizes represented by entries in input vector 210 is between one and a length of input vector 210. For example, for a 10-entry input vector 210, the entries may represent up to 10 different sizes of window 330. In one or more embodiments, a corner of window 330 remains in one place, and window 330 increases in area (by an increase in width and/or length) as the window index increases.

Having described how two-dimensional data (e.g., the "Image copy" of FIG. 3) may be transformed to one-dimensional data (e.g., input vector 210 in FIG. 3), refer again to FIG. 2A. Several copies of a set of data are generated, and each copy is transformed to an input vector 210, such as input vector 211 from a first copy, input vector 212 from a second copy, input vector 213 from a third copy, and input vector 21n from an nth copy. Each vector 210 may incorporate different information about the set of data, as extracted from the associated copy of the data. For example, each vector 211 . . . 21n may be generated using a different size or shape of window (e.g., window 310). For another example, each entry of vector 211 may be a representation of an intensity of a data point of interest (e.g., center pixel 340) in a corresponding window, whereas each entry of vector 212 may include representations of an average value (e.g., color or frequency) of a corresponding window, and vectors 213 . . . 21n include representations of other aspects of the set of data. Input vectors 211 . . . 21n are transformed in MLP 220 into output 230. The transformation into output 230 is a de-noising of the set of data by de-noising input vectors 211 . . . 21n, as is described in detail below.

In one or more embodiments, the information at the same offset in multiple input vectors 210 is determined in the same way. For example, the information at offset 4 of each input vector 211 . . . 21n represents an average intensity over a same size window 330 of an associated copy. In such embodiments, MCMLP 200 operates on a block of data corresponding to an offset, the block including the value at that offset of each input vector 210. In general terms, MCMLP 200 de-noises each offset of input vectors 210 using a nonlinear filter that operates along a data block composed of patch neighborhoods (e.g., window 330) of a data point and multiple copies of a set of data. Thus, the data point is de-noised using information from one block of size $D=r \times N_p$, where $N_p$ is the number of data points in a patch, and r is the number of copies. By way of example for an image, MCMLP 200 operates along patches in the image to account for possible spatial correlations in the random field of the image. As opposed to other methodologies, the technique of the present disclosure makes no assumptions about noise statistics, and there is no guesswork involved in determining suitable thresholds, parameters or dictionaries.

It should be noted that, rather than MLP, other types of neural networks and machine learning techniques can be used. Additionally, other types of nonlinear filters could be used, such as Bayesian adaptive filters.

With respect to sets of data which represent images, the techniques of the present disclosure are applicable to a range of images, such as images of an area on the order of one square centimeter or smaller, or an area of multiple square centimeters, meters or kilometers. The size of the images themselves are determined by the medium used to display the images, and the techniques of the present disclosure are not limited by display type or resolution. Further, the techniques of the present disclosure are not limited by matrix size (e.g., 512×512 or 1024×1024), and are rather applicable to any matrix size of image (or any size of other type of data). By way of example, an imaging system can include a microscope, an MM system, an ultrasound (US) imaging system, an X-Ray imaging system, a telescope, a satellite imaging system, or a charge coupled device (CCD) or other type of camera.

Sets of data (e.g., image data) may be acquired by de-noising system 100 itself, or received from an external device. Sets of data may be acquired or received (e.g., through input circuitry 144 or communication circuitry 148) in digital form, or may be acquired or received (e.g., through input circuitry 144 or communication circuitry 148) in analog form and converted (e.g., input circuitry 144, interface 142 or processor 110) to digital form.

Multiple sets of data may be received or acquired, or multiple copies of a set of data generated by the de-noising system 100, for use by the MCMLP 200, as described below. The multiple sets of data or multiple copies may be stored (e.g., in memory 120), and each is stored separately (e.g., without averaging).

Figure 4:
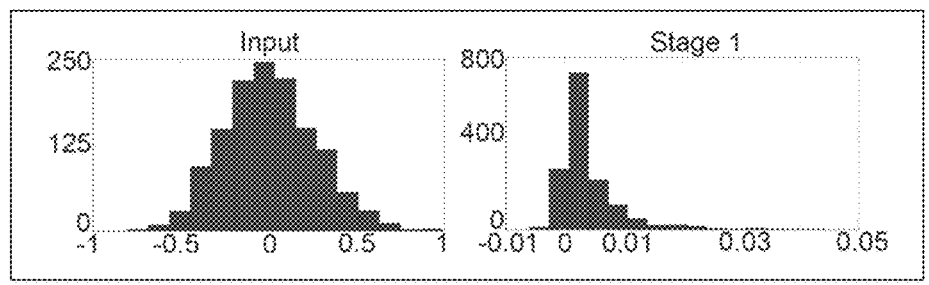
FIG. 4 depicts two graphs as an example of results of using a de-noising technique according to an embodiment of the present disclosure.

FIG. 4 depicts two graphs as an example of the de-noising effectiveness of MCMLP 200. The graph on the left represents a Gaussian input noise distribution of an image, and the graph on the right represents a noise distribution after de-noising in one stage of MCMLP 200.

The following description of a multiple copy analysis is presented in terms of images. However, as noted above, the techniques of the present disclosure are also applicable to other sets of data (e.g., with dimensionality greater than 2). With respect to images, an image is considered a mapping, which can be expressed as in equation (1), where S is a set of allowed pixel values.

$$Y: \{1, \ldots, N_x\} \times \{1, \ldots, N_y\} \to S \qquad (1)$$

The Cartesian product $\{1, \ldots, N_x\} \times \{1, \ldots, N_y\}$ will be indexed by $t=(i,j)$. An experimentally measured image contains noise and is therefore a random field X whose realization is denoted by $X(\omega)$. $X_t(\omega)$ can represent the value of the $t^{th}$ pixel in the image $X(\omega)$ in a matrix of size $N_x \times N_y$. The probability space is $(\Omega, F, P)$, where F is a σ-algebra on Ω, $\omega \in \Omega$ and Ω is the set of all possible outcomes shown in equation (2), where $(j=1, \ldots, N_I)$ is an $N_x \times N_y$ matrix whose elements belong to the set S and $I_i \neq I_j$ for $i \neq j$.

$$\Omega = \{I_1, I_2, \ldots, I_{N_I}\}, N_I = (\#S)^{N_x \times N_y} \qquad (2)$$

There is no fundamental restriction on S. For example, if S is a discrete set such as $S=\{0, 1, \ldots, 255\}$, then the σ-algebra on Ω can be taken to be the power set $F=2^\Omega$ whereas if S is a continuous interval such as [0, 255] then Ω can be taken to be the Borel σ-algebra generated by the interval.

P is a probability measure depending on the nature of the experiment and could be unknown or arbitrary. Its structure can be inferred from individual realizations $\omega_1, \omega_2, \ldots$ For fixed $\omega \in \Omega$, the mapping $X_t(\omega) \to S$ as a function of t yields a realization (simple path) of the random field. The simple path is an image in the sense of the mapping of equation (1).

De-noising by multiple copies includes finding an estimator $\hat{Y}$ of the true image Y given priori information from 'r' realizations of the sample path $\{X(\omega_1), X(\omega_2), \ldots, X(\omega_r)\}$, where $X(\omega)=\eta(\omega, Y)$, such that $\hat{Y} \approx Y$ according to a suitable distance metric. Here, $\eta(\omega, \cdot)$, stands for the noise function, which is determined by the probability measure, P. An example of $\eta(\omega, \cdot)$ is additive white Gaussian noise (AWGN), which takes the form $X(\omega)=Y+\Gamma(\omega)$, where $\Gamma(\omega)$ is an $N_x \times N_y$ matrix of random values that are Gaussian-distributed.

To obtain a good estimate of $\hat{Y} \approx Y$, the uncertainty of the estimate is reduced. There are multiple ways to reduce the uncertainty of the estimate.

One approach to obtain more information is to look at more instances of X, for example, by having several copies of the same image (e.g., $\{X(\omega_1), X(\omega_2), \ldots, X(\omega_r)\}$, where r is sufficiently large. Since $X(\omega)$ varies with each instance $\omega$ according to the noise distribution whereas Y is independent of $\omega$, the more instances of $\omega$, the more certain is the value of the estimate. Because more instances of $\omega$ increases computational cost, a compromise between certainty and computational cost may be, for example, r=7.

Another approach to obtain more information is to look at the neighborhood of the pixel $X_t(\omega)$. For example, denote the coordinates of the neighborhood by the set of points in a square region $U_t$ centered on $t=(i,j)$, as shown in equation (3).

$$U_t = \{t'=(i',j') | i' \in [i-d, i+d], j' \in [j-d, j+d]\} \quad (3)$$

$U_t$ is referred to as a patch in the following, where d is a number of pixels included away from the pixel's coordinates $t=(i,j)$. In some implementations, d is selected automatically by de-noising system 100, for example, based on a size of an image or region of interest. In other implementations, a user inputs a value for d through a user interface to the de-noising system 100. The patch region $U_t$ contains $N_p = (2d+1)^2$ pixels.

When de-noising images it is important to account for spatial correlations in the random field due to the shape of the deterministic function, or possible spatial correlations in the noise function (if any).

The de-noising system 100 uses the information from r copies and a patch $U_t$ centered on the pixel $X_t$ with neighborhood distance d, and determines a noise function, $\exists f$ as in equation (4), where $X(\omega_1)|U_t$ denotes the restriction of the matrix $X(\omega_1)$ to the $U_t$ neighborhood. It is a $(2d+1) \times (2d+1)$-dimensional matrix with entries taking values in S.

$$\exists f(X(\omega_1)|U_t, X(\omega_2)|U_t, \ldots, X(\omega_r)|U_t) = \tilde{Y}_t^o \quad (4)$$

$\tilde{Y}^o$ is the best estimate of Y that can be obtained from the information provided by all r copies $X(\omega_1)|U_t, X(\omega_2)|U_t, \ldots, X(\omega_r)|U_t$ of the $U_t$ neighborhood, for all such neighborhoods ($\forall t$). The r two-dimensional matrices $X(\omega_1)|U_t, X(\omega_2)|U_t, \ldots, X(\omega_r)|U_t$ are reshaped into one-dimensional vectors of length $N_p$, then concatenated into a one-dimensional vector of length $D = r \times N_p$ denoted by $\vec{x}_t$ and input to a MLP whose transfer function is a hyperbolic tangent (although other types of transfer functions or a combination of transfer functions can also be used). Thus, an MLP with D inputs, K outputs, and one hidden layer with M nodes yields a K-dimensional output vector $\vec{\tilde{y}}_t$ whose k-th component is given by the iterated hyperbolic tangents in equation (5), where $z(l) = \tanh(\Sigma_{j=0}^{D} \theta_{j,l}^{(1)} x_t(j))$, for $l=0, \ldots, M$ are the outputs of the hidden layer.

$$\tilde{y}_t(k) = \tanh\left(\sum_{l=0}^{M} \theta_{l,k}^{(2)} \tanh\left(\sum_{j=0}^{D} \theta_{j,l}^{(1)} x_t(j)\right)\right) \quad (5)$$

Here, $\theta_{0,l}^{(1)}$ and $\theta_{0,k}^{(2)}$ represent biases to the transfer function, where $z(0)=1$ and $x_t(0)=1$. The remaining parameters in $\theta_{j,l}^{(1)}$ and $\theta_{l,k}^{(2)}$ are weights. The generalization to arbitrary numbers of hidden layers is done by nesting additional hyperbolic tangents. The calculation of the vector $\vec{\tilde{y}}$ is called feed forward propagation. In example implementations, each MLP has a single output corresponding to a single pixel in the image. Thus, K=1, and the vector notation can be dropped, writing $\tilde{y}$ instead of $\vec{\tilde{y}}$.

Let $\vec{\theta} = [\theta_{j,l}^{(1)}|_{j=0 \ldots D}^{l=0 \ldots M}, \theta_{l,k}^{(2)}|_{l=0 \ldots M}^{k=0 \ldots K}]$ represents a vector of length m containing weights and bias values for all nodes. The MLP is trained to solve for f by searching for an optimal $\vec{\theta}$ that minimizes a sum of square errors in equation (6).

$$E(\vec{\theta}) = \frac{1}{2} \sum_{s=1}^{S} e_s(\vec{\theta})^2 \quad (6)$$

In equation (6), $e_s(\vec{\theta}) = y_s - \tilde{y}_s$ is the MLP error corresponding to sample s for a given set of MLP parameters. Here, $y_s$ is the desired target value for a low noise image for an input vector $\vec{x}_s$ from a noisy training sample, and $\tilde{y}_s$ is the MLP estimate of $y_s$. While the coordinate t is a suitable index in the feed forward phase where every pixel in the image is processed, t is denoted by s in the training phase where an error is calculated. Training samples are input-output pairs $(\vec{x}_s, y_s)$ picked from training images in no specific order, where the entire image or only parts of the image might be used for training. s corresponds to the sample number in the training dataset. S is the total number of training samples. The technique minimizes the errors at all nodes. Back-propagation uses the output error of equation (6) to determine errors of individual nodes in the remaining layers. From $$n(k) = \sum_{l=0}^{M} \Theta_{l,k}^{(2)} \tanh\left(\sum_{j=0}^{D} \Theta_{j,l}^{(1)} x(j)\right),$$

the partial error for a weight $\Theta_{l,k}^{(2)}$ is obtained by equation (7)

$$\frac{\partial E(\vec{\theta})}{\partial \theta_{l,k}^{(2)}} = \frac{\partial E(\vec{\theta})}{\partial n(k)} z(l) \quad (7)$$

The error at a node is determined by taking into account the sum of partial errors of weights for all connections emanating from it. $\vec{\theta}$ is iteratively updated using a Levenberg-Marquardt search, and $\Delta \vec{\Theta}$ is calculated at each iteration using the update rule in equation (8) and is added to $\vec{\theta}$. Note that training is not limited to the Levenberg-Marquardt technique, and other training techniques can be applied.

$$\Delta \vec{\Theta} = -[J^T J + \mu 1]^{-1} J^T \vec{e}. \quad (8)$$

$\vec{e} = (e_1, e_2, \ldots, e_s)$ is a vector of MLP errors for all samples. Here, 1 is an identity matrix and J is the Jacobian matrix containing first derivatives of MLP errors with respect to the $\vec{\theta}$ parameters, as shown in equation (9).

$$J = \begin{bmatrix} \frac{\partial e_1(\vec{\Theta})}{\partial \Theta_1} & \frac{\partial e_1(\vec{\Theta})}{\partial \Theta_2} & \cdots & \frac{\partial e_1(\vec{\Theta})}{\partial \Theta_m} \\ \frac{\partial e_2(\vec{\Theta})}{\partial \Theta_1} & \frac{\partial e_2(\vec{\Theta})}{\partial \Theta_2} & \cdots & \frac{\partial e_2(\vec{\Theta})}{\partial \Theta_m} \\ \vdots & \vdots & \ddots & \vdots \\ \frac{\partial e_S(\vec{\Theta})}{\partial \Theta_1} & \frac{\partial e_S(\vec{\Theta})}{\partial \Theta_2} & \cdots & \frac{\partial e_S(\vec{\Theta})}{\partial \Theta_m} \end{bmatrix} \qquad (9)$$

When μ is large, aspects of the technique behave like a steepest descent method. When μ is small, aspects of the technique behave like a Gauss-Newton method. μ is updated at each iteration depending on how E changes.

Example Application

De-noising according to the present disclosure is divided into two phases, a training phase and a feed forward phase. The training phase is where the MLPs learn to build an optimized model for an application at hand, and this phase is where the nonlinear filter is designed. The training phase can take anywhere from 15 minutes to several hours on a modern laptop computer, depending on the noise level of the set of data. Once the training phase is complete, the MLPs operate in feed forward mode, where the nonlinear filter is applied to new image data. The feed forward phase is much faster than the training phase. The time to de-noise an image in the feed forward phase is on the order of several seconds to a few minutes, depending on the size of the image and capability of the de-noising system 100.

Training Phase—Multiple Stages

To reduce computational cost, several small MLPs are trained in multiple stages, rather than training one large MLP. The MLP architecture can be optimized to further enhance performance. The MLPs used in tests of this example feature six hidden layers each with ten nodes per layer. Performance is better with more training samples, but larger datasets involve more nodes, increasing MLP size and computation time. The lower the noise level, the less training is involved. Thus, training is done in a first stage of small MLPs with a relatively small dataset to minimize noise to a high degree. When training is done, first stage MLPs operate in feed forward mode and are used to de-noise original training images. The end result is a set of estimates with arbitrary residual errors, yielding arbitrary noise distributions with much smaller standard deviation. It has been found that seven MLPs are effective (with a tradeoff in performance) in the training phase, although more MLPs would be more effective, and fewer MLPs would have reduced computational cost. Seven first stage MLPs yield seven estimates for each training image, with much lower noise than original copies. Estimates are used to generate a new dataset for training the second de-noising stage MLPs. Multiple MLP stages can be added in a similar manner and trained hierarchically. In the tests described, four MLP stages were used. In other implementations, a different number of stages can be used, depending on the type of application and size of the data set.

This multistage de-noising approach is powerful and is a major driving force behind the performance of the technique. Multistage de-noising is generally not possible with other noise removal methodologies. This is because other methodologies make assumptions about noise statistics whereas the MLP approach is noise independent. For example, a method that is designed for use with Rician noise generally cannot be used for multistage de-noising because its output does not necessarily have a Rician noise distribution.

Multiple Copies

Before patches from r noisy copies are introduced to the input layers of the first de-noising stage MLPs, the patches are first grouped into r combinations of (r−1) copies. This produces r distinct realizations of an image random field with reduced noise levels. This reduces noise levels at the input to allow shorter training times. This operation is made possible because the MLP de-noising technique is noise independent. This technique is not applicable in general to other methodologies where assumptions are made about noise distribution.

Patch Size

Using d=8 for equation (3) results in patches of size 17×17. When 7 copies are used this yields a total input vector of length 2023. Multistage training allows using smaller patches per stage while still allowing the system to use information from a large patch size. This concept is illustrated in FIG. 3. For d=2 for first stage MLPs, each output represents a center pixel from patches of size 5×5 from original noisy copies. Using d=2 for second stage, each output represents a center pixel from the 5×5 patches from the first de-noising stage MLP estimates. This collectively gives an effective patch size of 9×9 from original noisy copies to be used as inputs for the second de-noising stage MLPs. In general, the effective d value for a stage is the sum of individual d values from previous stages. This technique reduces processing and memory requirements, making the technique applicable to devices with low computational resources. Using a smaller d value in a consecutive stage yields a reduction in dimensionality, giving the option of optimizing for speed or memory. Larger d values are typically assigned for the first training stage where smaller data sets can be used. Decreasing d in subsequent stages allows for larger data sets.

Feature Extraction

In the discussion so far in this example, each stage includes multiple MLPs. Ultimately, one final value is desired for each pixel. One way to do this is by averaging values of all estimates from the final stage MLPs. Alternatively, an additional stage can be added with one MLP and d=0 to get a final value. However, instead of using raw MLP outputs to train this additional (now final) stage, feature extraction is used to enhance generalizing ability. For example, a mean, standard deviation, minimum and maximum of outputs from stage 2 are used to train the MLPs in stage 3 to get a final result.

Feed Forward Phase

After completing MLP training for all stages, the system is used in feed forward mode where image de-noising is performed. In this example, seven noisy copies of an image are used to produce a clean estimate. Patches are extracted for each pixel from its surrounding neighbors for all 7 copies, producing 7 patches of size $N_p=(2d+1)^2$. De-noising is performed hierarchically. While MLPs in each stage are independent and can be processed in parallel, the performance at each stage depends on results from preceding stage. Pixel estimates from the first stage are reorganized into their corresponding positions in the image. The same data acquisition process is performed on the first stage image estimates using d values of the second stage. The final stage produces one final estimate for each pixel. The estimates are regrouped to produce a final estimate of the de-noised image. The total time for de-noising an image depends on its size.

The computer used in this example was a laptop equipped with a 4-core Intel® Core™ i7-3610QM CPU @ 2.30 GHz per core. The average time for de-noising of an 128×128 image was approximately 15 s. Time grows linearly with the number of pixels (e.g., a 256×256 image takes approximately 15 s×4=60 s).

Results

Results obtained for various noise levels and distributions indicate that the technique can outperform other methodologies given enough training time and samples, where training times were reasonable. The longest training time encountered was still less than 10 hours. Because the technique allows optimizing performance for specific applications while maintaining good generalizing ability, datasets are on the order of hundreds of thousands of training samples.

Table 1 is a comparison of the MCMLP technique of the present disclosure with two other methodologies, MLP (multilayer perceptrons) and BM3D (block matching and 3D filtering). For MLP, the comparison was to a published MLP methodology, where a trained MLP demonstration was downloaded and used in the comparison. Notably, the MLP demonstration had been trained for one month, and the MCMLP technique of the present disclosure outperformed the MLP demonstration after one hour of training on a standard laptop computer. For BM3D, the comparison was to a published BM3D methodology, where a trained BM3D demonstration was downloaded and used in the comparison. The MCMLP technique of the present disclosure outperformed the BM3D demonstration after ten hours of training. The results in Table 1 are a comparison of the MCMLP technique of the present disclosure after ten hours of training, compared to the downloaded MLP and BM3D demonstrations. Training of the MCMLP used copies of a training image, with AWGN added to each copy at noise level $\sigma=25$ and standard deviation of $25\sqrt{7}$, for AWGN introduced into each copy as $X_t=Y_t+25\sqrt{7}\Gamma_t(\omega)$.

A test image used in the Table 1 comparison was a two-dimensional MRI image. Seven copies of the test image were made, and an average image, representing an average of the seven copies of the test image, was also made. Three metrics are shown in column A of Table 1, the PSNR in decibels (dB), the FSIM and the MSSIM. Column B presents metrics for a noisy copy of the test image. Column C presents metrics for the average image (the average of seven noisy copies of the test image). Column D presents metrics after MLP was applied to the average image. Column E presents metrics after BM3D was applied to the average image. Column F presents metrics after MCMLP was used with the seven noisy copies of the original image.

TABLE 1

| A Metric | B Noisy copy of test image | C Average image of 7 noisy copies of test image | D MLP applied to the average image | E BM3D applied to the average image | F MCMLP using 7 noisy copies of the test image |
|---|---|---|---|---|---|
| PSNR, dB | 11.723 | 20.242 | 30.615 | 31.228 | 31.242 |
| FSIM | 0.450 | 0.687 | 0.922 | 0.933 | 0.936 |
| MSSIM | 0.135 | 0.425 | 0.869 | 0.908 | 0.919 |

As can be seen by the results presented in Table 1, the MCMLP technique of the present disclosure outperforms the MLP and BM3D methodologies after a relatively short amount of training.

Table 2 provides a comparison between the MCMLP technique of the present disclosure with two other methodologies, BM4D (block matching and 4D filtering) and TV (total variation). For BM4D, the comparison was to a published BM4D methodology, where a trained BM4D demonstration was downloaded and used in the comparison. For TV, the comparison was to an existing TV demonstration. Because BM4D requires nine slices as input, there were nine original volumetric slice images. Seven noisy copies of each original image were made, and the seven noisy copies averaged to an average image for the slice. The BM4D demonstration was applied to the average image for each of the nine slices. The TV demonstration was applied to the average image of the ninth slice. MCMLP was applied to the seven noisy copies of the ninth slice.

In Table 2, Column B presents metrics for a noisy copy of the ninth slice. Column C presents metrics for the average image (the average of seven copies) of the ninth slice. Column D presents metrics after the BM4D demonstration was applied to the average images from the nine slices. Column E presents metrics after TV was applied to the average image of the ninth slice. Column F presents metrics after MCMLP was used with the seven copies of the ninth slice. The comparison was repeated for different values of added Rician noise. Table 2 represents experiments for a noise level $\sigma=20$. The experiments were repeated for each noise level $\sigma=40$, $\sigma=60$ and $\sigma=70$. The Rician noise was added such that $X_t(\omega)=\sqrt{(Y_{tR}+\sigma\Gamma_t^{(1)}(\omega))^2+(Y_{eI}+\sigma\Gamma_t^{(2)}(\omega))^2}$.

TABLE 2

| A Metric | B Noisy copy of the ninth slice | C Average of 7 noisy copies of the ninth slice | D BM4D applied to average image of each of nine slices | E TV applied to average image of the ninth slice | F MCMLP using 7 noisy copies of the ninth slice |
|---|---|---|---|---|---|
| PSNR, dB | 13.378 | 16.718 | 28.789 | 21.793 | 33.314 |
| FSIM | 0.658 | 0.832 | 0.894 | 0.896 | 0.951 |
| MSSIM | 0.073 | 0.273 | 0.804 | 0.703 | 0.907 |

Figure 5:
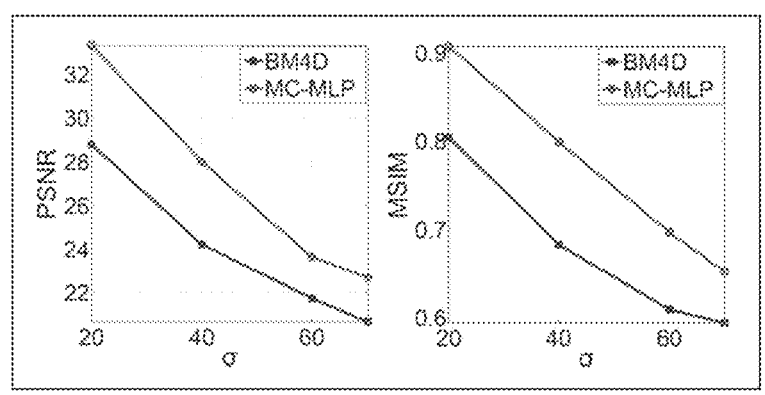
FIG. 5 presents graphs comparing results of using a de-noising technique according to an embodiment of the present disclosure with other methodologies, for different Rician noise levels.

FIG. 5 presents graphs comparing PSNR and MSIM for the MCMLP technique and the BM4D methodology, for the different Rician noise levels tested ($\sigma=20$, 40, 60 and 70). Data obtained by use of the BM4D demonstration is depicted having square points on the graphs and data obtained using the MCMLP technique is depicted having circular points on the graphs.

Figure 6:
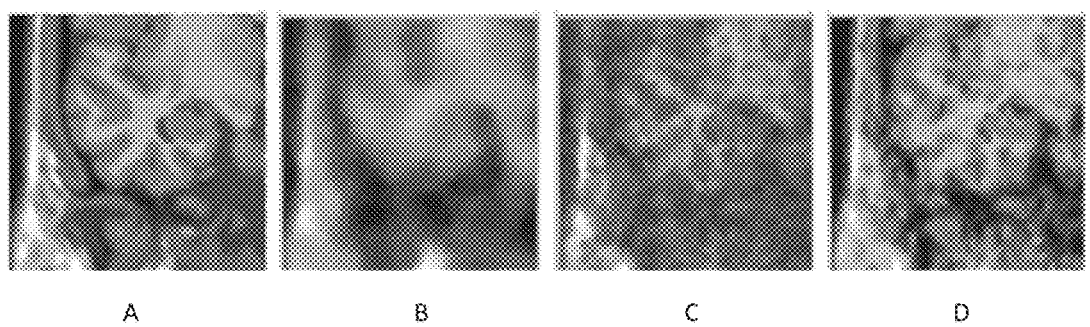
FIG. 6 presents images comparing results of using a de-noising technique according to an embodiment of the present disclosure with other methodologies.

FIG. 6 provides a visual comparison of the results of de-noising by the MCMLP technique versus the BM4D and TV demonstrations, for $\sigma=70$. Panel A is an enlarged portion of the original ninth slice, and Panels B-D are enlarged portions of an image de-noised by the MCMLP technique (Panel D) versus noise removal by the BM4D methodology (Panel B) and TV methodology (Panel C). As can be seen in FIG. 6, the MCMLP technique of de-noising results in preserving anatomical features, rather than smoothing or blurring the features as is the case for the BM4D and TV methodologies. These results demonstrate the ability of the MCMLP technique to capture finer features than other noise removal methodologies are able to do.

Figure 7:
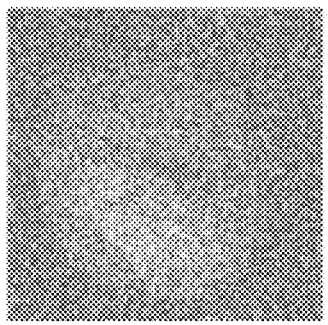
FIG. 7 illustrates results of a test showing the ability of a de-noising technique according to an embodiment of the present disclosure to perform in the presence of multiplicative noise.
Figure 7:
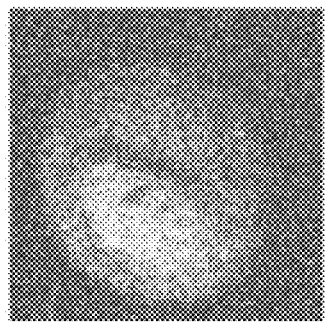
Figure 7:
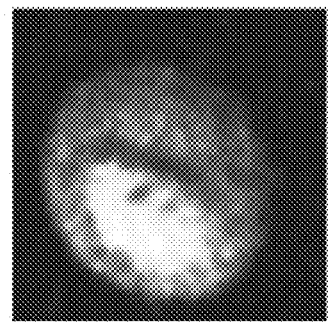
Figure 7:
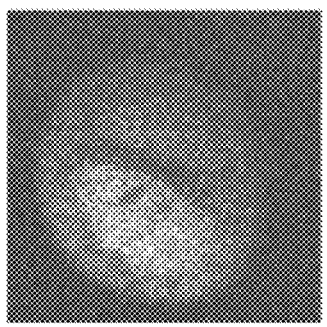
Figure 7:
Figure 7:
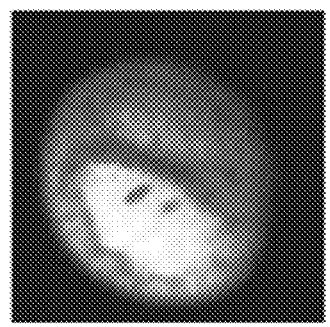
Figure 7:
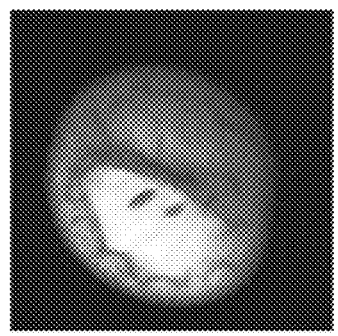

FIG. 7 illustrates results of another test, showing the ability of the MCMLP technique to perform in the presence of multiplicative noise. The technique is applied to de-noising MM images of a cherry tomato contaminated by noise distribution as shown in equation (10).

$$X_t(\omega))=\sigma_1\Gamma_t^{(1)}(\omega)(Y_t+\sigma_2\Gamma_t^{(2)}(\omega)), \quad (10)$$

Here, P is defined as follows: $\Gamma_t^{(1)}$ and $\Gamma_t^{(2)}$ are zero-mean Gaussian random fields which are statistically independent of each other and spatially uncorrelated in the sense that $\Gamma_t^{(i)}$, i=1,2 is independent of $\Gamma_u^{(i)}$ whenever t≠u. Thus, the spatial correlations in $X_t$ are due to the signal $Y_t$.

The MCMLP technique was tested at different noise levels by varying the value of $\sigma_2$. Because other methodologies are not designed for this type of noise, comparison is made of the results of the system to the mean value of the noisy copies. FIG. 7 illustrates results for $\sigma_2$=50 (Panels A-C) and $\sigma_2$=10 (Panels D-F). The original image with high signal-to-noise ratio is shown in Panel G. A noisy copy ($\sigma_2$=50) of the original image is shown in panel A, an average of seven noisy copies ($\sigma_2$=50) of the original image is shown in panel B, and de-noising of the image with MCMLP using seven noisy copies ($\sigma_2$=50) of the original image is shown in panel C. A noisy copy ($\sigma_2$=10) of the original image is shown in panel D, an average of seven noisy copies ($\sigma_2$=10) of the original image is shown in panel E, and de-noising of the image with MCMLP using seven noisy copies ($\sigma_2$=10) of the original image is shown in panel F.

As can be seen in FIG. 7, the MCMLP technique is good at removing noise even under conditions of extreme noise.

Figure 9:
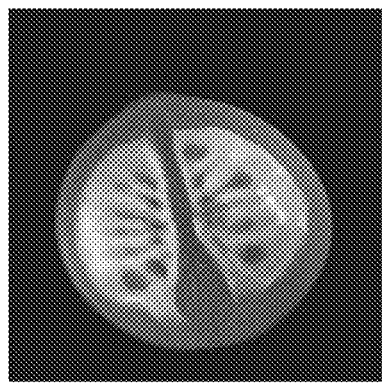
FIG. 9 presents an ideal target image with minimal noise.

In the experiments reported above, MRI images were contaminated with synthetic noise to control the type and variability of the noise. Another experiment used a weighted image of a cherry tomato acquired on a Varian 9.4 T micro-imaging system using a spin-echo imaging sequence, and several methodologies (BM4D, TV, optimized block-wise Rician non local means (ORNLM) filter, adaptive non-local means (AONLM) filter, adaptive multiresolution non-local means (ONLM) filter, oracle-based 3D discrete cosine transform (ODCT) filter, prefiltered rotationally invariant nonlocal means (PRINLM) filter) were compared to the MCMLP technique. Different noise levels (noise level 1, 2 and 3, leftmost column) were created by adjusting a repetition time value in the pulse sequence. The performance of each de-noising methodology was evaluated using the performance metrics of PSNR, FSIM, and MSSIM and the results are given in Table 3. The MCMLP technique outperformed other methodologies for all noise levels, according to all performance metrics.

image of the cherry tomato is shown in FIG. 9 for comparison. A salient feature of the MCMLP technique is that not only is the SNR of the de-noised image higher, even under conditions of extreme noise levels, but the features of the image are preserved.

Thus is described a feature-preserving image de-noising approach in which a nonlinear filter is designed using a hierarchical multistage system of MLPs. From the point of view of conventional metrics (PSNR, FSIM, MSIM), the method outperforms state-of-the art methodologies from low to high noise levels, and can handle additive and multiplicative noises. Other methodologies are limited to special cases where the known noise distribution meets narrow criteria. The technique of the present disclosure is general and is applicable to situations with arbitrary noise distributions and extreme noise levels. The technique can also be used in situations where the noise distribution is not known, where the technique models the noise distribution from experimental data. The technique of the present disclosure, as seen by the examples above, achieves good signal-to-noise ratio while highlighting features.

The filtering is computationally efficient and shows that multiple copies of the same image allows more effective noise removal with better preservation of anatomical features. Competing noise removal methodologies tend to smooth images to the point where important anatomical details are lost. There are several possible scenarios in which the method could be applied. One such application is MRI, where low SNR or low contrast-to-noise ratio situations frequently arise. Namely, with low-field MRI, MM of low sensitivity nuclei (such as $^{23}$Na), diffusion tensor imaging in the presence of strong diffusion gradients, MR spectroscopy of metabolites at low concentrations or functional MM. Other scenarios could include X-ray, positron emission tomography and ultrasound imaging. The method could also be applied to video data using neighboring frames provided that, for example, the motion is not too large or that motion tracking is used to co-register the images. It is shown that as little as seven copies can be used for good performance, making the method practical in terms of data acquisition times, as low-SNR situations generally involve far more than seven signal averages. It is noted that fewer or greater than seven copies may be used for de-noising, depending on the application. In general, more copies can help improve the performance of de-noising, however, the computational cost may increase accordingly.

The techniques of the present disclosure have been shown to have relatively low computation cost as compared to other methodologies. For example, the MCMLP technique after approximately one hour of training on a standard laptop computer outperformed the MLP methodology with

TABLE 3

| | 1 Copy | Mean | MC-MLP | BM4D | TV | ORNLM | AONLM | ONLM | ODCT | PRINLM |
|---|---|---|---|---|---|---|---|---|---|---|
| Noise Level 1 - PSNR | 17.95, | 20.61, | 26.13, | 22.56, | 25.82, | 25.78, | 23.07, | 25.71, | 23.13, | 24.01, |
| FSIM | 0.72, | 0.87, | 0.93, | 0.92, | 0.92, | 0.90, | 0.90, | 0.90, | 0.89, | 0.92, |
| MSSIM | 0.09 | 0.33 | 0.81 | 0.79 | 0.78 | 0.70 | 0.73 | 0.71 | 0.71 | 0.78 |
| Noise level 2 - PSNR | 14.02, | 16.46, | 21.71, | 19.50, | 19.48, | 20.77, | 19.25, | 21.15, | 19.17, | 20.30, |
| FSIM | 0.57, | 0.72, | 0.85, | 0.85, | 0.79, | 0.76, | 0.76, | 0.76, | 0.78, | 0.85, |
| MSSIM | 0.04 | 0.09 | 0.70 | 0.58 | 0.42 | 0.41 | 0.37 | 0.44 | 0.47 | 0.52 |
| Noise Level 3 - PSNR | 12.95, | 13.85, | 19.39, | 17.81, | 16.73, | 18.33, | 16.54, | 18.28, | 16.54, | 17.06, |
| FSIM | 0.53, | 0.58, | 0.78, | 0.76, | 0.60, | 0.76, | 0.54, | 0.54, | 0.63, | 0.78 |
| MSSIM | 0.03 | 0.04 | 0.60 | 0.33 | 0.12 | 0.31 | 0.11 | 0.18 | 0.26 | 0.33 |

Figure 8:
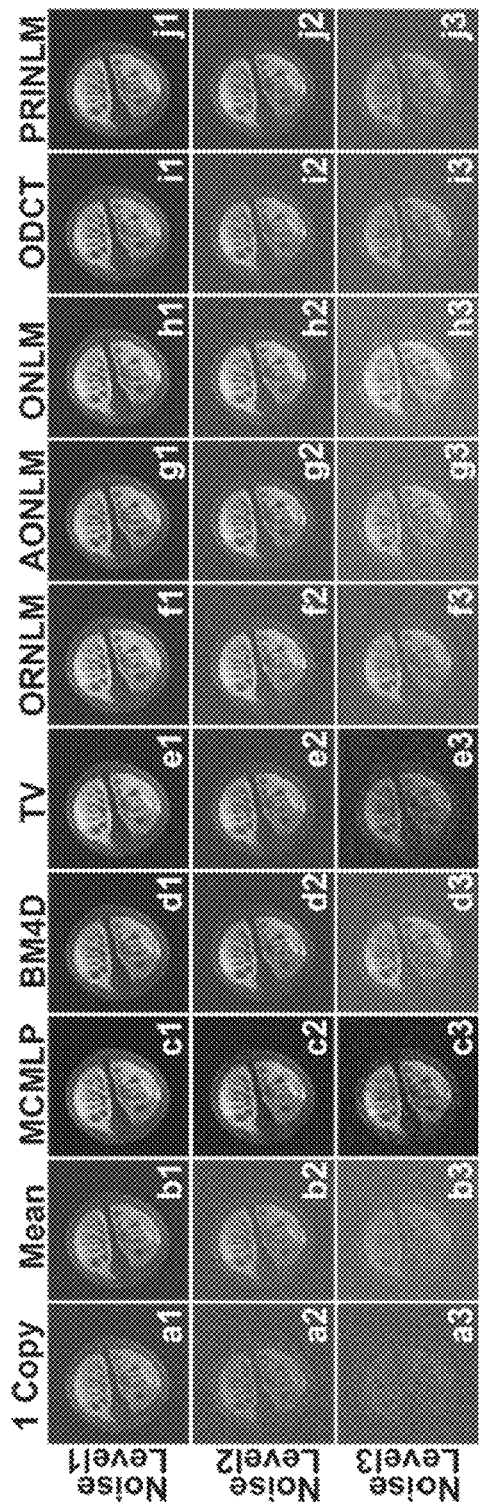
FIG. 8 presents images comparing results of using a de-noising technique according to an embodiment of the present disclosure with other methodologies.

FIG. 8 provides images corresponding to the results presented in Table 3. A high signal-to-noise ratio (SNR)

approximately one month of training, and the results are as described in Table 1 (Column D versus Column F).

As previously noted, the techniques of the present disclosure include a training phase and an application phase (e.g., feedforward phase). With reference to FIG. 2A, examples of pseudo-code are provided next for the training phase and the application phase.

Training Phase

```
STAGE 1:
FOR all noisy training images
    FOR all copies
        Deconstruct noisy training image copy
        Add to stage 1 training input data
    END
    Deconstruct corresponding clean training image
    Add to training target data
END
FOR each stage 1 MLP
    Train MLP using training data
    De-noise training data using trained MLP
    Reconstruct MLP outputs
END
STAGE 2:
FOR all stage 1 de-noised images
    FOR all copies
        Deconstruct image copy obtained from reconstruction of stage 1
            de-noising outcome
        Add to stage 2 training input data
    END
END
FOR each stage 2 MLP
    Train MLP using training data (where target data is the same as
        stage 1)
    De-noise input data from stage 1 using trained MLP
    Reconstruct MLP outputs
END
Repeat for remaining stages
```

Application Phase

```
STAGE 1:
    FOR all copies
        Deconstruct noisy image copy
        Add to stage 1 input data
    END
    FOR each stage 1 MLP
        De-noise input data using MLP
        Reconstruct MLP outputs
    END
STAGE 2:
    FOR all copies
        Deconstruct image copy obtained from
            reconstruction of stage 1 de-noising
                outcome
        Add to stage 2 input data
    END
    FOR each stage 2 MLP
        De-noise input data from stage 1 using MLP
        Reconstruct MLP outputs
    END
    Repeat for remaining stages.
```

Figure 10:
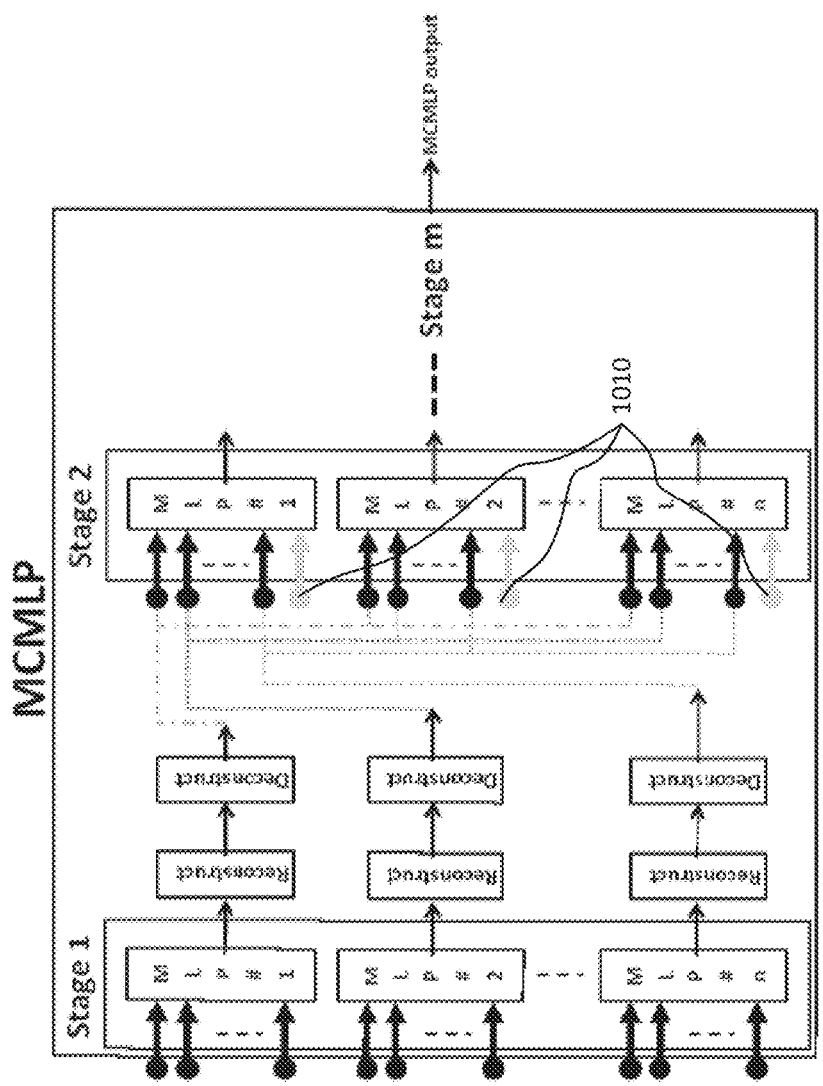
FIG. 10 illustrates inputting outputs of other noise methodologies into a de-noising technique according to an embodiment of the present disclosure.
Figure 12:
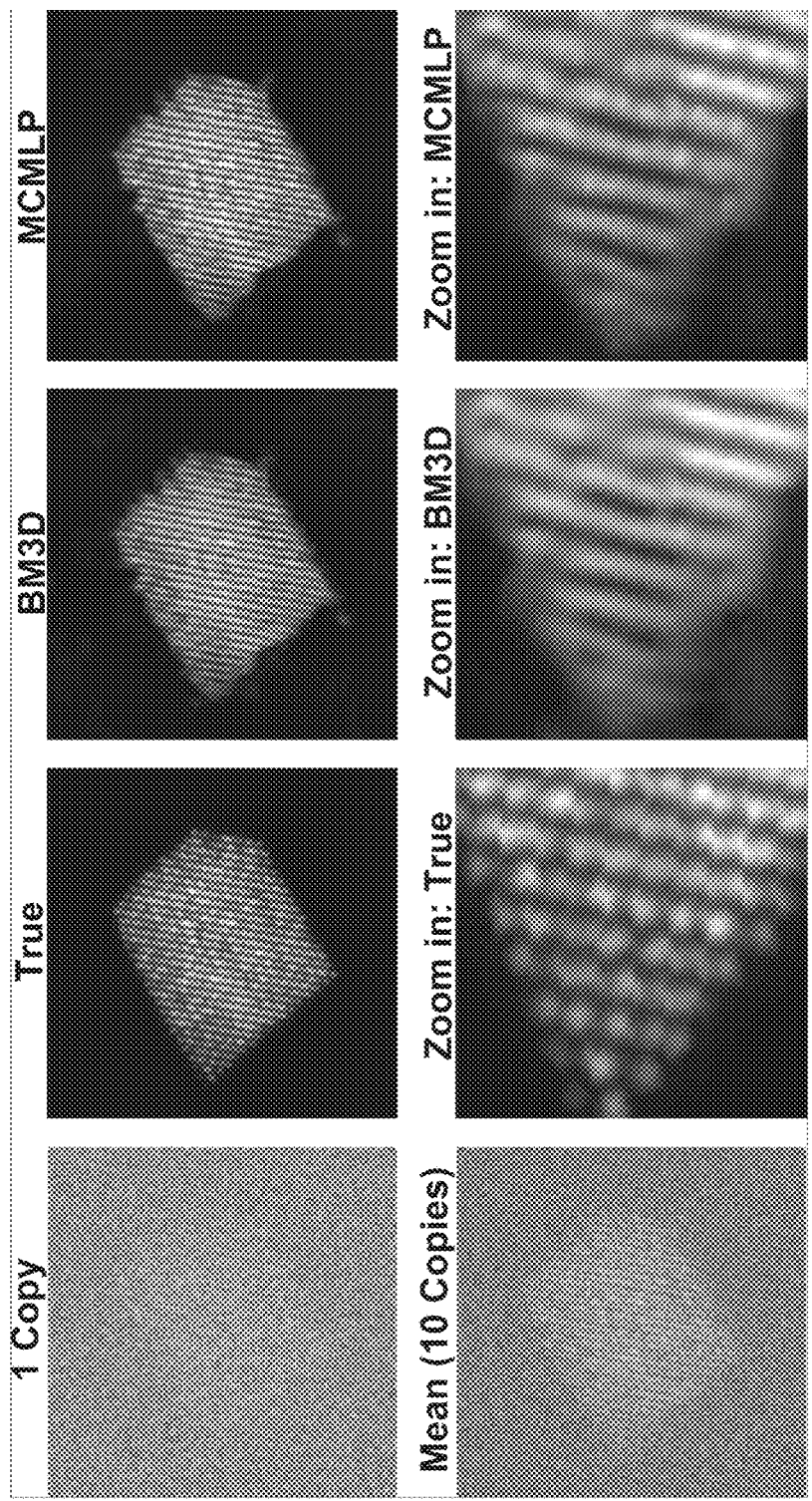
FIG. 12 presents images comparing results of using a de-noising technique according to an embodiment of the present disclosure with another methodology.

One application is in the field of high resolution electron tomography. Scanning transmission electron microscopy is used to determine the structure of nanoparticles at an atomic resolution. Several projections of a metal nanoparticle are acquired at different tilt angles and are contaminated by multiplicative Poisson shot noise by the imaging system. The projections are de-noised and used to estimate the 3D structure of the nanoparticle. FIG. 10 illustrates using an outcome of an adaptation of BM3D (another noise removal methodology) as an additional input 1010 for MCMLP. The MCMLP can enhance the performance of the BM3D results since it also has access to additional information that it obtains by learning the noise statistics from its multiple copies input. Using the BM3D as an additional input speeds up the time required for training the MCMLP, since it's closer to the desired clean output than the noisy copies. However, to prevent the MCMLP from being biased towards the BM3D input, this input is added at a second or later stage, as shown for the example of FIG. 10, at inputs 1010 from BM3D. If the BM3D input is added at the first stage the MCMLP may be prone to ignoring the information it can extract from the noisy multiple copies by getting stuck at a local minimum. As can be seen from FIG. 12, MCMLP yields better separation between individual atoms as shown in the zoomed-in images. BM3D blurs some critical features of the image (atoms) to the point where it becomes impossible to distinguish individual atoms.

In general, MCMLP can be hybridized with any existing methodology, where it can learn from results obtained by other methodologies and enhance over them. It can combine results from several methodologies, where each methodology usually excels in certain aspects and lacks in others. MCMLP can combine their advantages and enhance their individual performance.

Figure 11:
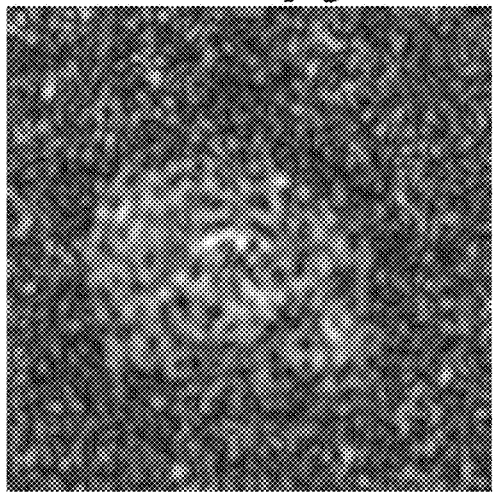
FIG. 11 presents images comparing results of using a de-noising technique according to an embodiment of the present disclosure with other methodologies.
Figure 11:
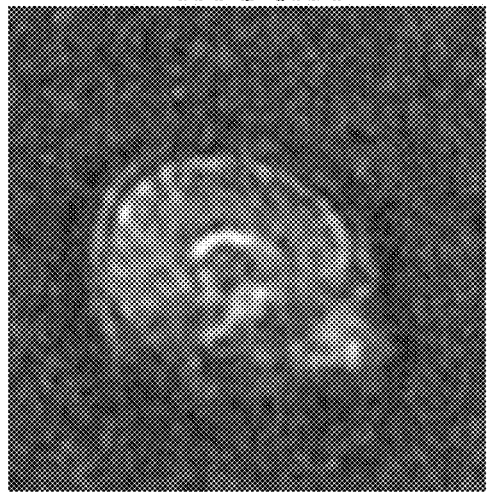
Figure 11:
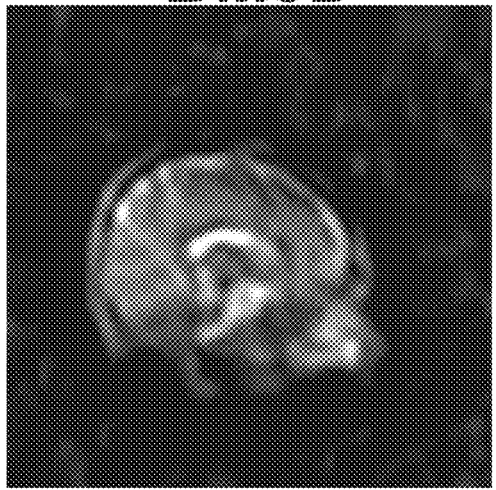
Figure 11:
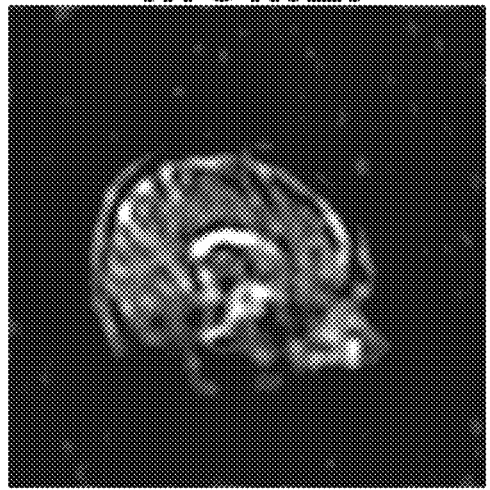

Further, as noted above, MCMLP is applicable to data which is variable in terms of noise type, level and distribution. For example, Na is an insensitive nucleus in MRI imaging characterized with poor SNR. Sodium is not as abundant as hydrogen is in proton MRI, which translates to a much lower SNR. The challenge in the case of sodium imaging lies in the difficulty to obtain a clean sodium image for training the MCMLP technique. This is an example of an application where some noise statistics information is missing. MCMLP does not need all training data to possess the same noise statistics. For example, it can be trained with a range of noise levels for a given noise distribution. For a fixed number of training samples and training time, the bigger the range the lower the performance. However, this allows for an iterative training approach. A relatively big range is used in training a MCMLP for the first iteration to give an estimate of the noise statistic. This estimate is used for training another MCMLP in the second iteration, yielding a higher performance. A more accurate noise estimation can be obtained from the second iteration to train a third iteration and so on. The same concept also applies, for example, to de-noising images acquired using ($^{31}$P) phosphorus MM. An example of pseudo code for training and use of the MCMLP technique for the sodium and phosphorus MRIs (or other such applications) is provided next. In the pseudo code, level 1 noise refers to the lowest noise level, and level n noise refers to the highest noise level. The noise level increases linearly for levels in between. Brain MM data may be acquired as a 3D volumetric image. MCMLP can be trained using 3D windows. 2D training can also be used for de-noising 3D data, where de-noising is performed one slice at a time. In this case, a 3D volumetric image can be traversed slice by slice along each of its three axis. In brain imaging notation, this allows viewing slices in the sagittal, axial, and coronal planes. Thus, each voxel in the volume is shared by three planes with the exception of voxels on the edges, these can be dealt with using zero padding. By de-noising the slices along the three axes, each voxel is de-noised three times, where the mean of the three results is then calculated to give a cleaner final result. FIG. 11 provides results of a comparison between MCMLP and BM3D for sodium MM.

The following pseudo code provides an example of a training phase for sodium MM.

Training Phase

---

Generate n copies of clean training images
contaminated with level 1 synthetic noise
Deconstruct resulting noisy training image copies
Add to training input data
Generate n copies of clean training images
contaminated with level 2 synthetic noise
Deconstruct resulting noisy training image copies
Add to training input data
.
.
.
Generate n copies of clean training images
contaminated with level n synthetic noise
Deconstruct resulting noisy training image copies
Add to training input data
Train first MCMLP
De-noise noisy experimental data using first MCMLP
Use result to get an estimation of the noise statistics
for the experimental noisy data
Generate n copies of clean training images contaminated
with estimated noise statistics
  from first MCMLP
Deconstruct resulting noisy training image copies
Add to training input data
Train second MCMLP
De-noise noisy experimental data using second MCMLP
Use result to get a better estimation of the noise statistics
for the experimental noisy data
Generate n copies of clean training images contaminated
with estimated noise statistics
  from second MCMLP
Deconstruct resulting noisy training image copies
Add to training input data
Train additional MCMLPs similarly

---

Many other applications of MCMLP are possible. Some examples follow.

Advantages of the MCMLP technique are most apparent under extreme conditions, where performance of conventional methods degrades. This makes MCMLP the perfect candidate for sensor-arrays applications, such as electrode arrays implants in bionic eyes or in the brain.

Scanning electron microscopy (SEM) is another application of MCMLP due to its challenging noise statistics. SEM images suffer from electrical "charging", where the object gets electro statically charged as the electrons land on it. This leads to a nearly total loss of image contrast due to saturation. A time-course scan can be acquired while the sample is progressively charging. In a normal SEM context, scans of short exposure times are not useful because the SNR is too low. However, with MCMLP, multiple scans of short exposure times can be acquired and stored separately and used for de-noising. By acquiring a series of short scans before the same charges, multiple copies obtained from the time-course could be used by MCMLP to de-noise effectively because many of the early copies are acquired prior to sample charging.

Surveillance cam video, especially under dim lighting conditions can be dark and noisy, and objects often look small and have low resolution. Consecutive video frames, or aligned frames obtained from multiple cameras, can be used to obtain multiple copies for MCMLP to enhance the quality of the images. This can lead to a better identification of objects in surveillance videos, especially in the case of videos acquired in dim light. The same technique can be applied to infrared cameras, such as night vision imaging systems. Note that the conditions of dim light are not absolutely needed, and could instead refer to dim contrast. For example, daytime vision images contain a lot of background signals and the object sought could appear as a small change over the large background signal (i.e., yielding conditions of weak contrast-to-noise ratio (CNR)). The MCMLP technique can be used to extract details from weak CNR images by regarding the large background signal as baseline signal.

New smart phone photo technology allows capturing several frames at a high rate for each individual picture. One "best" frame is typically chosen as the still picture. MCMLP can be used to further enhance the picture quality by considering the multiple frames as multiple copies of the same image (with possible motion correction to realign the images, if motion is present), where the frames can be very similar due to the high acquisition frame rate.

While the disclosure has been described with reference to the specific embodiments thereof, it should be understood by those skilled in the art that various changes may be made and equivalents may be substituted without departing from the true spirit and scope of the disclosure as defined by the appended claims. For example, other patch sizes could be used; fewer or more copies of the same image/signal could be used; and other types of neural networks or machine learning techniques could be used instead of, or in combination with, MLP. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A noise removal system comprising a processor, the processor configured to perform a first stage of reconstruction including a first portion, the first portion of the first stage of reconstruction comprising to:
   receive a plurality of copies of a data space;
   for each copy of the plurality of copies, create an input vector representing the copy, the input vector created by applying a window to successive locations of the copy, and for each of the successive locations, transforming data within the window into a single data point of the input vector;
   provide a set of input vectors, including an input vector for each copy of the plurality of copies, to a first stage neural network;
   receive from the first stage neural network an output vector representing the set of input vectors; and
   generate from the output vector a reconstructed image,
   the processor further configured to determine a noise function from the first stage of reconstruction, receive a noisy image and generate a corrected image of the noisy image based on the noise function,
   wherein the window is a variable window of variable length, variable width, or variable length and width.

2. The system of claim 1, wherein the data space represents an image.

3. The system of claim 1, wherein the data space represents one of an audio, radio frequency, sonar, or ultrasound signal.

4. The system of claim 1, wherein the data space is multi-dimensional.

5. The system of claim 1, wherein transforming data within the window includes applying a nonlinear filter to the data of the window.

6. The system of claim 1, the first stage of reconstruction comprising a plurality of portions including the first portion, the plurality of portions performed in parallel, the plurality of portions each generating a reconstructed image.

7. The system of claim 6, the processor further configured to perform a second stage of reconstruction, the second stage of reconstruction comprising to:
for each of the reconstructed images of the first stage of reconstruction, deconstruct the reconstructed image into a second stage input vector;
apply each second stage input vector as an input to each of a plurality of second stage neural networks in the second stage of reconstruction; and
generate a set of second stage reconstructed images, each second stage reconstructed image generated by one neural network of the plurality of second stage neural networks.

8. The system of claim 7, wherein each of the plurality of second stage neural networks comprises a multilayer perceptron.

9. A noise removal system comprising a processor, the processor configured to perform a first stage of reconstruction including a first portion, the first portion of the first stage of reconstruction comprising to:
receive a plurality of copies of a data space;
for each copy of the plurality of copies, create an input vector representing the copy, the input vector created by applying a window to successive locations of the copy, and for each of the successive locations, transforming data within the window into a single data point of the input vector;
provide a set of input vectors, including an input vector for each copy of the plurality of copies, to a first stage neural network;
receive from the first stage neural network an output vector representing the set of input vectors; and
generate from the output vector a reconstructed image,
the first stage of reconstruction comprising a plurality of portions including the first portion, the plurality of portions performed in parallel, the plurality of portions each generating a reconstructed image,
the processor further configured to perform a second stage of reconstruction, the second stage of reconstruction comprising to:
for each of the reconstructed images of the first stage of reconstruction, deconstruct the reconstructed image into a second stage input vector;
apply each second stage input vector as an input to each of a plurality of second stage neural networks in the second stage of reconstruction; and
generate a set of second stage reconstructed images, each second stage reconstructed image generated by one neural network of the plurality of second stage neural networks, the processor further configured to perform a plurality of stages of reconstruction on a set of training data during a training phase of the noise removal system, the plurality of stages including the first stage and the second stage, and determine a noise function from the performing of the plurality of stages of reconstruction.

10. The system of claim 9, the processor further configured to receive a noisy image and generate a corrected image of the noisy image based on the noise function.

11. The system of claim 1, wherein the first stage neural network comprises a multilayer perceptron.

12. A noise removal method comprising:
receiving in a de-noising system a plurality of noisy copies of a target image;
providing the plurality of noisy copies as input data to the de-noising system in a training phase;
for n stages of the de-noising system,
transforming the input data into an output;
reconstructing the output; and
including the reconstructed output with the input data; and
determine a noise distribution for the plurality of noisy copies.

13. The noise removal method of claim 12, further comprising providing an output of a noise removal methodology as an input to one stage of the n stages.

14. The noise removal method of claim 12, further comprising receiving the target image for the training phase.

15. The noise removal method of claim 12, further comprising receiving a new image and generating a de-noised image based on the determined noise distribution.

16. The noise removal method of claim 12, wherein the n stages each includes a multiple layer perceptron.

17. The system of claim 1, comprising a memory storing instructions executable by the processor to perform the first stage of reconstruction, determine the noise function from the first stage of reconstruction, receive the noisy image and generate the corrected image of the noisy image based on the noise function.

18. The system of claim 9, comprising a memory storing instructions executable by the processor to perform the plurality of stages of reconstruction and determine the noise function from the performing of the plurality of stages of reconstruction.

* * * * *